(12) United States Patent
Hahn

(10) Patent No.: US 6,622,736 B1
(45) Date of Patent: Sep. 23, 2003

(54) WATER-SOLUBLE GLASS AS CORROSION PROTECTION FOR GLASSWARE IN A DISHWASHING MACHINES

(75) Inventor: Karlheinz Hahn, Otterstadt (DE)

(73) Assignee: Reckitt Benckiser N.V., Hoofddorp (NL)

( * ) Notice: Subject to any disclaimer, the term of this patent is extended or adjusted under 35 U.S.C. 154(b) by 0 days.

(21) Appl. No.: 09/868,478

(22) PCT Filed: Dec. 29, 1999

(86) PCT No.: PCT/EP99/10467

§ 371 (c)(1),
(2), (4) Date: Aug. 15, 2001

(87) PCT Pub. No.: WO00/39259

PCT Pub. Date: Jul. 6, 2000

(30) Foreign Application Priority Data

Dec. 29, 1998 (DE) .......................................... 198 60 670

(51) Int. Cl.⁷ ................................................ B08B 9/20
(52) U.S. Cl. .................. 134/25.2; 134/25.1; 134/25.4; 134/42; 510/220; 510/224; 510/232; 510/233
(58) Field of Search ........................ 134/25.2, 42, 25.1, 134/25.4; 510/220, 224, 232, 233

(56) References Cited

U.S. PATENT DOCUMENTS 3,677,820 A * 7/1972 Rutkowski .................. 134/25.2
4,931,078 A * 6/1990 Yamamoto .................. 504/151

FOREIGN PATENT DOCUMENTS

| EP | 0 057 088 A1 | 8/1982 | ............ C11D/3/06 |
| EP | 0 383 482 A2 | 8/1990 | ............ C11D/3/395 |
| WO | WO95/12652 | 5/1995 | ............ C11D/3/08 |
| WO | WO97/11151 | 3/1997 | ............ C11D/17/00 |

OTHER PUBLICATIONS

Abstract: JP 63–308100 (Dec. 16, 1988).

* cited by examiner

Primary Examiner—Randy Gulakowski
Assistant Examiner—M. Kornakov
(74) Attorney, Agent, or Firm—Akin Gump Strauss Hauer & Feld, L.L.P.

(57) ABSTRACT

A water soluble glass is used in dishwashing machines as corrosion protection for glassware. The water soluble glass consists of at least one compound which, in the cleaning and/or rinsing cycles, releases an agent that protects glassware against corrosion. Each of the compounds accounts for no more than 85 molar % of the glass and the solubility of the water soluble glass is defined by a mass loss of at least 0.5 mm under the conditions specified in DIN ISO 719.

26 Claims, No Drawings

WATER-SOLUBLE GLASS AS CORROSION PROTECTION FOR GLASSWARE IN A DISHWASHING MACHINES

BACKGROUND OF THE INVENTION

The invention relates to a new type of use for a water-soluble glass to protect glassware from corrosion during washing and/or rinsing cycles of a dishwashing machine, compositions intended for use in a dishwashing machine for the aforesaid purpose and a method of inhibiting the corrosion of glassware during washing and/or rinsing cycles of a dishwashing machine.

The problem of glassware corroding during washing and/or rinsing cycles of a dishwashing machine has long been known. Current opinion is that the problem of corrosion in glassware is the result of two separate phenomena. On the one hand, the corrosion is clearly due to minerals escaping from the glass composition accompanied by hydrolysis of the silicate network. On the other hand, silicate material is released from the glass. After several washes in a dishwashing machine, both phenomena can cause damage to glassware such as cloudiness, scratches, streaks and similar.

Silicate compounds are known to be effective in preventing minerals from being released from the glass composition but on the other hand can tend to increase the separation of silicate material at the surface of the glass.

Various proposals have been put forward as a means of dealing with the problems described above.

One approach is to use zinc, either in metallic form (U.S. Pat. No. 3,677,820) or in the form of zinc compounds. The use of soluble zinc salts as a means of preventing the corrosion of glassware in dishwasher detergents is described in U.S. Pat. No. 3,255,117, for example.

Because of a number of disadvantages inherent in using soluble zinc salts (in particular the formation of a precipitate of insoluble zinc salts with other ions in the washing or rinsing water), European patent applications EP 0 383 480, EP 0 383 482 and EP 0 387 997 propose the use of insoluble zinc compounds as a means of inhibiting the corrosion of glassware in automatic dishwashing machines. Specifically, the insoluble zinc salts proposed are zinc silicate, zinc carbonate, zinc oxide, basic zinc carbonate (approximately: $Zn_2(OH)_2CO_3$), zinc hydroxide, zinc oxalate, zinc monophosphate ($Zn_3(PO_4)_2$) and zinc pyrophosphate ($Zn_2(P_2O7)$). When using zinc salts of this type in granular cleansing compounds, the insoluble zinc compound is specified as having a maximum particle size of less than 1.7 mm (EP 0 383 482), whilst a mean particle size of less than 250 $\mu$m is specified for the insoluble zinc compound used in a liquid dishwasher compound (EP 0 383 480 and EP 0 387 997).

The disadvantage of this prior art essentially resides in the fact that, because the zinc compounds are not readily soluble or are insoluble, it is difficult to ensure that a sufficient quantity of active agent will always be present in the washing or rinsing liquid to protect glassware from corrosion. Furthermore, in view of the high specific density of the insoluble zinc compounds listed, problems of separation arise with powdered mixtures or settlement in the case of liquid mixtures.

Finally, all of the known compositions are intended to be active during only one specific stage of the washing cycle, i.e. if admixed with a granular detergent composition during the washing cycle or if admixed with a liquid rinsing composition with the rinsing cycle. None of the known compositions has the capacity to become and remain active starting from the pre-wash cycle and/or one of the intermediate rinsing cycles onwards.

The underlying objective of the present invention is to resolve at least one, but preferably all of the existing problems outlined above.

SUMMARY OF THE INVENTION

This objective is achieved by the invention due to the use of a water-soluble glass to protect glassware from corrosion, the water-soluble glass being made from at least one compound which releases an active anti-corrosion agent during the washing and/or rinsing cycles of a dishwashing machine, each of these compounds accounting for no more than 85 molar % of the glass and the solubility of the water-soluble glass being defined by a mass loss of at least 0.5 mg under the conditions specified in DIN ISO 719.

By preference, the solubility of the water-soluble glass is such that the mass loss under the specified conditions is at least 10 mg, more preferably at least 50 mg.

The invention additionally proposes that the compound (s). which release(s) an active agent to protect glassware from corrosion during the washing and/or rinsing cycles of a dishwashing machine should be from the group consisting of the oxides of zinc, aluminium, tin, magnesium, calcium, strontium, titanium, zirconium, manganese and/or lanthanum and/or precursors thereof.

In one particular embodiment, the invention proposes that at least one of the compounds used should be zinc oxide and/or a precursor thereof.

By preference, at least one of the glass-forming components of the water-soluble glass is phosphorus pentoxide and/or a precursor thereof.

Also particularly preferred as a glass component(s) is (are) one or more alkali metal oxides and/or precursors thereof.

In one especially preferred embodiment, the invention proposes using the water-soluble glass in the form of a tablet, the tablet preferably being made by casting or drawing the water-soluble glass.

Alternatively, the water-soluble glass is used in crushed form, either in the form of glass platelets or in around form.

In ground form, the mean particle size is preferably at most 500 $\mu$m.

The invention additionally relates to a composition for use in a dishwashing machine, containing an active quantity of a water-soluble glass in crushed form to protect glassware from corrosion, the water-soluble glass being made from at least one compound which releases an active agent to protect glassware from corrosion during washing and/or rinsing cycles of a dishwashing machine, each of these compounds accounting for at most 85 molar % of the glass and the solubility of the water-soluble glass being defined by a mass loss of at least 0.5 mg under the conditions specified in DIN ISO 719.

The water-soluble glass is preferably used either in the form of thin glass platelets or in ground form, most preferably with a mean particle size of at most 500 $\mu$m.

The composition proposed by the invention contains the water-soluble glass in a quantity of from 0.1 to 10.0% by weight, more preferably from 0.5 to 5.0% by weight.

In an alternative embodiment, the invention proposes a composition for use in a dishwashing machine, characterized in that it contains an active quantity of a water-soluble glass tablet form to protect glassware from corrosion, the water-soluble glass being made from at least one compound which releases an active agent to protect glassware from corrosion during washing and/or rinsing cycles of a dishwashing machine, each of these compounds accounting for at most 85 molar % of the glass and the solubility of the water-soluble glass being defined by a mass loss of at least 0.5 mg under the conditions specified in DIN ISO 719.

The tablet proposed by the invention is preferably made by casting or drawing the water-soluble glass.

With both the composition in which the water-soluble glass is present in crushed form and in the embodiment where the water-soluble glass is provided as a tablet, the solubility of the water-soluble glass is such that the mass loss under the specified conditions is preferably at least 10 mg, more preferably at least 50 mg.

In both cases, the compound(s) which release(s) an active agent to protect glassware from corrosion during washing and/or rinsing cycles of a dishwashing machine is (are) from the group consisting of the oxides of zinc, aluminium, tin, magnesium, calcium, strontium, titanium, zirconium, manganese and/or lanthanum and/or precursors thereof.

In one particular embodiment, the invention proposes that at least one of the compounds should be zinc oxide and/or a precursor thereof.

Preferably, at least one of the glass-forming components of the water-soluble glass is phosphorus pentoxide and/or a precursor thereof.

One or more alkali metal oxides and/or precursors thereof may also be used as glass component(s).

The invention additionally relates to a method of inhibiting the corrosion of glassware in washing and/or rinsing cycles of a dishwashing machine by bringing the glassware into contact with washing and/or rinsing water containing an active quantity of a composition containing the water-soluble glass in ground form.

Alternatively, a composition as proposed by the invention is prepared in the form of a tablet, placed in the interior of the dishwasher at a point which is accessible to the washing and/or rinsing water.

Before giving a detailed explanation of the features and advantages of the present invention, it should be pointed out that for the purpose of the present invention, the concept "glass" should be construed as meaning not only glass in the narrower sense, i.e. an amorphous, non-crystalline, transparent substance produced by hardening a melt, but also that produced by hardening a melt which has crystalline inclusions in an amorphous glass matrix.

DETAILED DISCLOSURE

The present invention solves at least one and, in preferred embodiments, all the problems inherent in the prior art described above in a surprisingly simple manner.

By using a water-soluble glass as a "base" for one or more reagents to protect glassware from corrosion in a dishwasher, the problems caused by the extensive formation of precipitate from insoluble salts which result in an undesirable deposit, such as occurs with the prior art in particular due to the use of soluble zinc salts for this purpose, are avoided. Instead, the active agents, such as zinc ions, for example, are released from the water-soluble glass proposed by the invention into the washing or rinsing water in a delayed release pattern so that there is always only a small concentration of active agents present. In this concentration, although the agents are effective in protecting glassware against corrosion, they are not present in a high enough concentration to lead to the undesirable formation of insoluble salts to any significant degree. The disadvantages of using insoluble zinc compounds described above are therefore also avoided by using the water-soluble glass proposed by the invention.

By using the water-soluble glass proposed by the invention in ground form as an additive to standard dishwasher products, which are generally made as powders or liquids, the problem of separation described above is also resolved since the use of a water-soluble glass offers greater flexibility in terms of adjusting the specific density to requirements.

If the water-soluble glass proposed by the invention is provided in tablet form and placed in the interior of the dishwasher at a point which is accessible to the washing and/or rinsing water, e.g. in the cutlery basket, it will also provide, for the first time ever, active protection against corrosion throughout all washing and rinsing cycles, i.e. from the pre-rinse cycle through to the cleaning cycle and then the intermediate rinse cycles through to the final rinse cycle and, what is more, will last for several cycles. As a result, not only is glassware thoroughly protected against corrosion in the dishwasher, handling is made significantly easier and more convenient for the consumer.

The glasses proposed by the invention may be produced by melting mixtures of the oxide components or precursors thereof for a sufficient time to obtain a homogeneous melt, which is then cooled until it solidifies.

The tablets may be made using various methods, for example by casting (e.g. in a graphite mould), drawing, pressing or blowing.

If the glass proposed by the invention is used in crushed form, it may be ground in a grinder specifically suited to this purpose, for example, and an appropriate fraction of particles separated out, e.g. having an average particle size of at most 500 $\mu$m. However, particulate glass may also be produced by other methods, e.g. by breaking down thin glass discs, resulting in disc-shaped, thin platelets which may be up to several millimeters in diameter. Both embodiments, i.e. spherical particles with a specific maximum particle size and thin platelets, will reliably ensure thorough mixing with the dishwasher detergent and prevent separation during storage and transportation.

The solubility of the glass used is defined in accordance with DIN ISO 719. This test method tests glass as a material and is conducted on glass fines. Grains of a size of between 300 and 500 $\mu$m are extracted from 2 g of fines over a period of 60 min with water conforming to Quality 2 at 98° C. Further details of how the test is conducted can be found in the relevant standard. However, by contrast with the aforementioned standard, the degree of solubility is determined not by titration with acid but by a standard gravimetric definition of the mass loss.

EXAMPLE 1

In this example, a glass of the following composition was produced, using the method outlined below:

TABLE 1

| Component | Molar % |
|---|---|
| $P_2O_5$ | 20 |
| ZnO | 36 |

TABLE 1-continued

| Component | Molar % |
|---|---|
| $SO_3$ | 20 |
| $Na_2O$ | 10 |
| $Li_2O$ | 5 |
| $K_2O$ | 7 |
| CaO | 2 |

Ammonium compounds or carbonates of the respective elements were used as raw materials and the sulphate was incorporated by adding 20 molar % of zinc sulphate. The raw materials were mixed and melted in an aluminum oxide pan in oven electrically heated to 850° C. After a residence time of 3 h, the glass was poured out.

In order to produce an appropriate powder, the drained glass was cooled in air, ground with an impact cross-blade mill and screened to obtain a grain fraction with a mean particle size of less than 400 µm.

In order to produce a solid glass tablet, the hot glass was poured into a graphite mould and then cooled slowly in an annealing furnace starting at 300° C.

The resultant zinc phosphate glass has a solubility characterized by a mass loss of 75 mg under the conditions specified in DIN ISO 719.

The following comparative tests were conducted to ascertain the effectiveness of the glass proposed by the invention as a corrosion inhibitor for glassware in dishwashing machines. In a first series of tests, test glasses were rinsed 50 and 100 times in a special long-running dishwashing machine (Miele G540 Spezial). Powdered dishwasher detergent, Calgonit® Ultra 2-phase powder, was used as a reference substance. The comparative tests were conducted using the powdered or gel dishwasher detergent to which was added, by admixing or stirring, 1% by weight of the glass proposed by the invention in powdered form.

Another series of tests was conducted using the reference dishwasher detergent whilst simultaneously placing a solid block made from the glass proposed by the invention, the dimensions of which (prior to the test cycles) were 30 mm×30 mm×5 mm, in the cutlery basket of the dishwashing machine. The weight loss of the solid glass block after 100 rinsing cycles was approximately 22.5 g.

Dose of detergent: 20 g Calgonit® Ultra 2-phase powder per rinse cycle, automatically metered at the start of the washing cycle.

Water hardness in the machine: 0.1° dGH, central softening by means of an ion exchanger, internal ion exchanger not in operation.

Washing programme: 65° C. programme, i.e. (both the washing and the clear rinse cycle were run at 65° C.).

Water consumption per rinse cycle: 23.5 l.

Quantity of rinsing agent per cycle: 3 ml (Calgonit® rinsing agent).

The glasses were not soiled, in addition to test glasses, blind glasses were placed in the washing baskets.

The test objects consisted of the following types of glass:
Schott Zwiesel Glaswerke AG:
 "Neckarbecher" 1812/2, wine glass, crystal glass
 "Paris" 4858/42, large tumblers, crystal glass
Nachtmann Bleikristallwerke GmbH:
 "Opal", whisky glass; lead crystal glass
 "Bistro", whisky shot, lead crystal glass
Verrerie Cristallerie D'Arques:
 "Luminarc Octime Transparent", 30 cl whisky glass,
 "Luminarc Islande Dauphine", decorated large tumbler.

The weight loss of the test glasses after 50 and 100 rinsing cycles was gravimetrically determined. Perceptible changes in the glass surface were evaluated in daylight and in a special illuminated box. The illuminated box is a box with dimensions of 70 cm×40 cm×65 cm (L×B×H), the entire interior of which is pained matt black. The box is illuminated above with an Osram L 20 W/25 S lamp (60 cm in length), which is covered with a screen to the front. Racks are arranged in the box, on which the glasses can be placed. The front of the box is open.

The glass corrosion was visually assessed using the following scale:

| Evaluation | Damage in daylight | Damage in illuminated box |
|---|---|---|
| 0 | No change | No change |
| 1 | No visible clouding | Slight clouding |
| 2 | Barely any visible clouding | Clearly visible clouding |
| 3 | Readily visible clouding | Strong clouding |
| 4 | Significant damage, glass unsightly | — |

The results of the series of tests, based on an investigation of the effect of adding 1% by weight of the ground glass described above or placing it in the dishwashing machine as a solid glass block, as compared with the powdered reference dishwasher detergent, are set out in Tables 2a to 2e below.

Adding 1% of ground glass corresponds to the addition of approximately 0.35% of zinc oxide, since the corresponding glass contains approximately ⅓ zinc oxide.

As stated above, the weight loss of the solid glass block after 100 rinse cycles was approximately 22.5 g. From this, it can be calculated that the average weight loss per rinsing cycle is 225 mg. Based on a detergent dose of 20 g of powder and taking account of the fact that the glass contains approximately ⅓ zinc oxide, the quantity of zinc oxide added per rinsing cycle can be calculated as being 0.4%. Accordingly, approximately the same quantity of zinc oxide is released per rinsing cycle by adding 1% of ground glass or using the solid glass block.

TABLE 2a

| | Mass loss | | |
|---|---|---|---|
| | Reference | 1% ground glass | Solid glass |
| | 50 rinse cycles | | |
| Neckar | 38 | 23 | 10.5 |
| Paris | 57.5 | 36 | 25 |
| Octime | 28 | 24 | 14.5 |
| Islande Dekor | 561 | 223 | 122 |
| | 100 rinse cycles | | |
| Neckar | 83 | 33 | 24 |
| Paris | 130.5 | 53.5 | 38.5 |
| Octime | 60 | 29 | 20.5 |
| Islande Dekor | 1.093 | 474 | 308 |

TABLE 2b

Glass damage

| | Reference | 1% ground glass | Solid glass |
|---|---|---|---|
| | 50 rinse cycles | | |
| Neckar | 3.0 | 1.5 | 1.0 |
| Paris | 2.0 | 0 | 0.5 |
| Octime | 5.5 | 1.0 | 0 |
| Islande Dekor | 4.0 | 1.0 | 1.0 |
| | 100 rinse cycles | | |
| Neckar | 2.5 | 2.5 | 1 |
| Paris | 2.5 | 0 | 0.5 |
| Octime | 11.5 | 4.5 | 4.5 |
| Islande Dekor | 8.5 | 4 | 3 |

TABLE 2c

List of glass damage

| Reference | 50 rinse cycles | 100 rinse cycles |
|---|---|---|
| Glasses | | |
| Neckarbecher | GTk 2, GTm 1 | GTk 1-2, GTm 1 |
| Paris (large) | GTe 2 | GTe 2-3 |
| Octime | GTm 1-2, GTk 1-2 | GTm 3, GTk 3, CLk 3, CLc 2-3 |
| Islande Dekor | FA 1, DS 2, CLe 1 | FA 3, DS 3-4, CLe 2 |

TABLE 2d

List of glass damage

| With 1% glass powder | 50 rinse cycles | 100 rinse cycles |
|---|---|---|
| Glasses | | |
| Neckarbecher | GTk 1, GTm 0-1 | GTk 1-2, GTm 1 |
| Paris (large) | 0 | 0 |
| Octime | CLk 1 | GTm 1, GTk 1-2 CLk 2 |
| Islande Dekor | DS 1 | DS 2, FA 2 |

TABLE 2e

List of glass damage

| Solid glass | 50 rinse cycles | 100 rinse cycles |
|---|---|---|
| Glasses | | |
| Neckarbecher | GTk 1 | GTk 1 |
| Paris (large) | GTk 0-1 | GTk 0-1 |
| Octime | 0 | GTm 1-2, GTk 2, CLk 1 |
| Islande Dekor | 0 | DS 1-2, FA 1-2 |

GT = Glass clouding
m = Mouth edge area
CL = thin parallel streaking, "Cordlines"
k = Glass bowl
FA = Colour changes
s = Stein
DS = Decoration damage
f = Glass base
e = Glass crackling As may be seen from the tables, both adding 1% of ground glass and providing the solid glass block significantly improves protection against corrosion as compared with the reference composition, the protection afforded by the solid glass block being significantly better than that obtained by adding ground glass.

In another series of tests, the glass proposed by the invention was compared with the insoluble zinc oxide and not readily soluble zinc phosphate known from the prior art. In these instances, the detergent used was Calgonit® Ultra 2-phase gel (25 ml per rinse cycle). From Table 3a below, it may be seen that the protective effect against corrosion measured by mass loss in accordance with the method described above, obtained by adding 1% by weight of the glass proposed by the invention in this example corresponds to adding 0.5% of zinc oxide. However, since the zinc oxide content in the corresponding glass is only about ⅓, which means that the addition of 1% glass corresponds to about only 0.35% zinc oxide, the anti-corrosion effect produced by the glass proposed by the invention is surprisingly higher than that obtained simply by adding zinc oxide and is also superior to the effect obtained by adding an even higher concentration of zinc phosphate, expressed as ZnO.

TABLE 3a

Mass loss

| | 100 rinse cycles 0.25% ZnO | 1% glass | 0.5% ZnO | 1% Zn-Phos. (≅0.63% ZnO) |
|---|---|---|---|---|
| Neckarbecher | 22 | 14 | 12 | 20 |
| | 21 | 16 | 10 | 17 |
| Paris (large) | 36 | 18 | 21 | 38 |
| | 34 | 14 | 25 | 27 |
| Opal | 36 | 30 | 25 | 33 |
| Bistro | 42 | 34 | 34 | 33 |
| Total | 191 | 126 | 127 | 168 |

TABLE 3b

Glass damage

| | 100 rinse cycles 0.25% ZnO | 1% glass | 0.5% ZnO | 1% Zn-Phos. (≅0.63% ZnO) |
|---|---|---|---|---|
| Neckarbecher | GTk 1; MR 1 | GTk 0-1 | GTk 0-1 | GTk 2, GTm 2 |
| Paris (large) | GTe 1 | 0 | 0 | 0 |
| Opal | 0 | 0 | 0 | 0 |
| Bistro | 0 | 0 | 0 | 0 |

GT = Glass clouding
m = Mouth edge area
CL = thin parallel streaking, "Cordlines"
k = Glass bowl
FA = Colour changes
s = Stein
DS = Decoration damage
f = Glass base
e = Glass crackling

EXAMPLE 2

In this example, a glass of the following composition was made using the same method as that described with reference to example 1:

TABLE 4

| Component | Molar % |
|---|---|
| $P_2O_5$ | 20 |
| $Na_2O$ | 9.5 |
| $K_2O$ | 12 |
| CaO | 38 |
| $SO_3$ | 20.5 |

Initial tests on the effectiveness of the glass proposed by the invention as a glass corrosion inhibitor in dishwasher machines showed positive results similar to those obtained using the glass described in example 1.

EXAMPLE 3

In this example, a glass of the following composition was made using the same method as that described with reference to example 1:

TABLE 5

| Component | Molar % |
|---|---|
| $P_2O_5$ | 40.5 |
| $Na_2O$ | 20.3 |
| CaO | 10.7 |
| $Al_2O_3$ | 8 |
| $SO_3$ | 20.5 |

Initial tests on the effectiveness of the glass proposed by the invention as a glass corrosion inhibitor in dishwasher machines showed positive results similar to those obtained using the glass described in example 1.

The features of the invention disclosed in the description above and in the claims and drawings nay be used individually or in any combination to apply the invention in its different embodiments.

What is claimed is:

1. A method for inhibiting corrosion of glassware in a dishwashing machine, which method comprises bringing said glassware into contact, during a washing and/or rinsing cycle of the dishwashing machine, with a water-soluble glass comprising at least one glass-forming component, and at least one compound which releases an active anti-corrosion agent, each of the at least one compound accounts for no more than 85 molar percent of the glass, and a solubility of the water-soluble glass is defined by a mass loss of at least 0.5 mg following hydrolysis under conditions specified in DIN ISO 719.

2. The method according to claim 1 wherein the solubility of the water-soluble glass is defined by a mass loss of at least 10 mg following hydrolysis under the conditions specified in DfN ISO 719.

3. The method according to claim 2 wherein the solubility of the water-soluble glass is defined by a mass loss of at least 50 mg following hydrolysis under the conditions specified in DIN ISO 719.

4. The method according to claim 1 wherein the at least one compound which releases an active anti-corrosion agent is selected from the group consisting of oxides of zinc, aluminum, tin, magnesium, calcium, strontium, titanium, zirconium, manganese, lanthanum, mixtures thereof and precursors thereof.

5. The method according to claim 4 wherein the at least one compound which releases an active anti-corrosion agent comprises zinc oxide or a precursor thereof.

6. The method according to claim 1 wherein the at least one glass-forming component comprises phosphorus pentoxide or a precursor thereof.

7. The method according to claim 1 wherein the at least one glass-forming component is selected from the group consisting of alkali metal oxides and precursors thereof.

8. The method according to claim 1 wherein the water-soluble glass is used in a form of a tablet.

9. The method according to claim 8 wherein the tablet is made by casting or drawing the water-soluble glass.

10. The method according to claim 1 wherein the water-soluble glass is used in a ground form.

11. The method according to claim 10 wherein the ground glass has a mean particle size of at most 500 µm.

12. The method according to claim 1 wherein the water-soluble glass is used in a form obtained by breaking down thin glass discs.

13. A composition for use in a dishwashing machine to protect glassware from corrosion, which composition contains a quantity of a water-soluble glass in a crushed form, wherein the water-soluble glass consists essentially of at least one glass-forming component and at least one compound which releases an active anti-corrosion agent during a washing and/or rinsing cycle of the dishwashing machine, each of the at least one compound accounts for at most 85 molar percent of the glass, and a solubility of the water-soluble glass is defined by a mass loss of at least 0.5 mg following hydrolysis under the conditions specified in DIN ISO 719.

14. The composition according to claim 13 wherein the crushed, water-soluble glass is present in a quantity of from 0.1 to 10.0% by weight.

15. The composition according to claim 14 wherein the crushed, water-soluble glass in present in a quantity of from 0.5 to 5.0% by weight.

16. The composition according to claim 13 wherein the water-soluble glass is in a form of thin glass platelets.

17. The composition according to claim 13 wherein the water-soluble glass is in a ground form.

18. The composition according to claim 17 wherein the ground glass has a mean particle size of at most 500 µm.

19. A composition for use in a dishwashing machine to protect glassware from corrosion, which composition contains a quantity of a water-soluble glass in a tablet form, wherein the water-soluble glass consists essentially of at least one glass-forming component and at least one compound which releases an active anti-corrosion agent during a washing and/or rinsing cycle of the dishwashing machine, each of the at least one compound accounts for at most 85 molar percent of the glass, and a solubility of the water-soluble glass is defined by a mass loss of at least 0.5 mg following hydrolysis under the conditions specified in DIN ISO 719.

20. The composition according to claim 19 wherein the tablet is made by casting or drawing the water-soluble glass.

21. The composition according to claim 13 or 19 wherein the solubility of the water-soluble glass is defined by a mass loss of at least 10 mg following hydrolysis under the conditions specified in DIN ISO 719.

22. The composition according to claim 21 wherein the solubility of the water-soluble glass is defined by a mass loss of at least 50 mg following hydrolysis under the conditions specified in DIN ISO 719.

23. The composition according to claim 13 or 19 wherein the at least one compound which releases an active anti-corrosion agent is selected from the group consisting of oxides of zinc, aluminum, tin, magnesium, calcium, strontium, titanium, zirconium, manganese, lanthanum, mixtures thereof and precursors thereof.

24. The composition according to claim 23 wherein the at least one compound which releases an active anti-corrosion agent is zinc oxide or a precursor thereof.

25. The composition according to claim 13 or 19 wherein the at least one glass-forming component is phosphorus pentoxide or a precursor thereof.

26. The composition according to claim 13 or 19 wherein the at least one glass-forming component is selected from the group consisting of alkali metal oxides and precursors thereof.

* * * * *